US006941903B2

(12) United States Patent
Sičet al.

(10) Patent No.: US 6,941,903 B2
(45) Date of Patent: Sep. 13, 2005

(54) SYSTEM AND METHOD FOR ADDING AIR TO AN EXPLOSION CHAMBER IN AN ENGINE CYLINDER

(76) Inventors: Tihomir Sič, 24000 Subotica, Igmanska 14 (YU); Miladin Vidaković, 2400 Subotica, Tamiska 18 (YU)

( * ) Notice: Subject to any disclaimer, the term of this patent is extended or adjusted under 35 U.S.C. 154(b) by 0 days.

(21) Appl. No.: 10/863,475

(22) Filed: Jun. 8, 2004

(65) Prior Publication Data

US 2004/0255875 A1 Dec. 23, 2004

Related U.S. Application Data

(63) Continuation-in-part of application No. 10/858,939, filed on Jun. 2, 2004, and a continuation-in-part of application No. PCT/YU03/00012, filed on Sep. 4, 2003.

(30) Foreign Application Priority Data

Jan. 27, 2003 (YU) .............................................. P-52/03
Apr. 7, 2004 (YU) ............................................. P-292/04

(51) Int. Cl.⁷ .............................................. F02B 71/00
(52) U.S. Cl. .................................... 123/46 R; 123/533
(58) Field of Search ............................. 123/46 A, 46 B, 123/46 R, 46 SC, 533, 542, 527

(56) References Cited

U.S. PATENT DOCUMENTS

| 3,494,336 | A | * | 2/1970 | Myers et al. ................ 123/347 |
| 4,395,876 | A | * | 8/1983 | Marsee et al. ................ 60/284 |
| 4,478,304 | A | * | 10/1984 | Delano ........................ 180/165 |
| 4,966,000 | A | * | 10/1990 | Wolters ........................ 60/595 |
| 6,752,131 | B2 | * | 6/2004 | Poola et al. ................ 123/533 |

* cited by examiner

Primary Examiner—Mahmoud Gimie
(74) Attorney, Agent, or Firm—Foley & Lardner LLP

(57) ABSTRACT

An engine includes a piston located in a cylinder, an inlet through which at least a portion of fuel for an ignition and combustion is passed into the cylinder, an outlet through which exhaust from the combustion is removed from the cylinder, and an air injector that injects air into the cylinder after the ignition and before exhaust escapes through the outlet. The air injector injects sufficient air to burn out all active matter of the fuel, whereby emissions from the engine are free of active matter of the fuel.

18 Claims, 13 Drawing Sheets

SYSTEM AND METHOD FOR ADDING AIR TO AN EXPLOSION CHAMBER IN AN ENGINE CYLINDER

CROSS REFERENCE TO RELATED APPLICATIONS

This application is a continuation-in-part of U.S. patent application Ser. No. 10/858,939, filed on Jun. 2, 2004, which claims priority to Serbian Patent Application No. P-292/04, filed on Apr. 7, 2004, and this current application is also a continuation-in-part of PCT Application No. PCT/YU03/00012, filed on Sep. 4, 2003 which claims priority to Serbian Patent Application P-52/03, filed on Jan. 27, 2003. All of these applications are herein incorporated by reference.

BACKGROUND OF THE INVENTION

1. Field of the Invention

The present invention relates generally to internal combustion engines. More particularly, the present invention relates to a system and method for adding air to an explosion chamber in an engine cylinder.

2. Description of the Related Art

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

An internal combustion engine creates force by burning fuel and air. In general, internal combustion engines or "engines" have two assemblies— the engine head and the engine block. The head of conventional engines typically includes an intake valve that opens and closes an intake port and an exhaust value that opens and closes an exhaust port. The block of conventional engines generally includes a crankshaft which is turned by a piston as the piston moves up and down in a cylinder that connects the engine head and block. In operation, the intake valve opens to allow a fuel and air mixture to enter an explosion chamber in the cylinder with a piston forming the floor of the chamber. An explosion of the fuel and air is created by a spark from a spark plug. This explosion causes the piston in the chamber to move downward and rotate the crankshaft in the engine block. The exhaust value opens and allows the exhaust from the explosion to escape as the piston returns to its position in the chamber before the explosion, helping to push the exhaust through the exhaust valve.

The block of the engine and the housing of the crankshaft are usually assembled in one casting. The camshaft, which operates the valves, can be located in the head or the block. In engines cooled with water, the head and the block of the engine have ducts for the cooling water. Generally, the pistons are connected by piston rods with the crankshaft that is rotating. The crankshaft has a fixed location to ensure uniformity of the rotation of the engine. The bottom of the engine at the lower end of the housing of the crankshaft serves for the placement of oil for lubrication.

Many different types of combustion engines have been developed. For example, an Otto engine utilizes a four-stroke approach (known as the Otto cycle in honor of Nikolaus Otto, who invented it in 1867). The Otto engine prepares fuel and air for burning outside of the cylinder using a carburetor, which mixes the correct amount of fuel and air. Another type of engine is a diesel engine (also named after its inventor, Rudolf Diesel). Diesel engines do not have spark plugs, rather a diesel engine compresses air and injects fuel into the compressed air. The heat of the compressed air lights the fuel spontaneously. A third type of engine is the Wankel engine or Wankel rotary engine (named after Felix Wankel). Instead of moving a piston up and down, the Wankel engine rotates a triangular rotor. The force to move the rotor comes from a combustion of fuel and air contained in a chamber formed by part of the housing and one face of the triangular rotor.

Modern engines can also be classified by how the fuel and air are provided and the exhaust is removed. A "four-stroke engine" has two valves for each cylinder— a suction valve and an exhaust valve. During the first stroke, the piston moves from an upper portion of the cylinder towards the bottom. The increased space in the cylinder (from the movement of the piston) creates a force that pushes the fuel and air mixture out of the carburetor into the explosion chamber. During the second stroke, the piston moves from the bottom portion of the cylinder towards the top. The piston compresses the fuel and air mixture in the cylinder because the valves are closed. In the third stroke, the mixture is ignited by a spark in the spark plug. The mixture burns, increasing the temperature and the pressure. This pressure from the burning process pushes the piston from the upper to the lower portion of the cylinder, exerting a force to rotate the crankshaft. In the fourth stroke, the burned gases are exhausted out through an opened exhaust valve. The piston moves from the bottom towards the upper portion of the cylinder, pushing the remnants of burned gasses from the cylinder. The process then repeats itself.

In a "two-stroke engine," the filling and emptying of the cylinder happens during one part of the rotation of the crankshaft. Instead of suction and exhaust valves, the two-stroke engine has openings on the cylinder liner which are closed and opened by movement of the piston. Typically, the exhaust opening is located closer to the top of the cylinder than the intake opening. When the piston is moving up it creates pressure to push exhaust out the exhaust opening. Before the piston reaches the top of its movement in the cylinder, it covers over the exhaust creating pressure in the explosion chamber for the combustion to occur. When the piston is moving down, it uncovers the intake opening and acts as a pump to move the fuel and air mixture into the chamber.

Engines can also be categorized according to the position of the cylinders. Examples of engines with cylinders located in different positions are sequence or "in-line" engines, V-engines, rotation engines, and boxer engines. Sequence engine cylinders are placed one cylinder after another in a row. As a result, working strokes overlap, ensuring uniformity in the drive of the crankshaft. V-engine cylinders are placed in two lines set at an angle to each other. Thus, crankshafts for V-engines can be shorter than those for sequence engines. As discussed above, rotation engines, like the Wankel engine, do not have pistons that move in up-and-down fashion; rather the pistons are rotors formed in the shape of a triangle. In the first stroke of a rotation engine, the rotor rotates to open the intake opening, which allows a fuel and air mixture to enter a chamber. As the rotor rotates in a second stroke, the volume of the chamber decreases and the mixture is compressed. In a third stroke, a spark from the spark plug ignites the mixture. Burned gasses are spread and set the rotor in motion. The volume of the chamber again increases. In a fourth stroke, the first gasket of the chamber slides ahead along the exhaustion opening, opening it for the burned gasses to escape.

Boxer engine cylinders are flat in that they are located 180 degrees from each other. The crankshaft can be shorter than the crankshaft of the sequence engine, and in four cylinder engines, boxer engines only need three standing bearings. In a boxer engine with four cylinders, there is ignition on each half rotation of the crankshaft. Boxer engines are characterized by uniform flow of the rotary momentum, enabling a quiet workflow, because movement on one side of the engine levels with the movement on the other side.

Despite various advancements that have been made heretofore in engine technology, it would be desirable to improve conventional engines, such as the engines described above. For example, it would be desirable to reduce the quality of the exhaust from burning the fuel/air mixture. Moreover, it would be desirable to provide cleaner emissions from use of internal combustion engines.

SUMMARY OF THE INVENTION

In general, exemplary embodiments described herein relate to a system and method for adding air to an explosion chamber in an engine cylinder. An exemplary embodiment relates to an engine including a piston located in a cylinder, an inlet through which at least a portion of fuel for an ignition and combustion is passed into the cylinder, an outlet through which exhaust from the combustion is removed from the cylinder, and an air injector that injects air into the cylinder after the ignition and before exhaust escapes through the outlet. The air injector injects sufficient air to burn out all active matter of the fuel.

Another exemplary embodiment relates to a system for adding air to an explosion chamber in an engine cylinder. The system includes a piston located in a cylinder and an air injector that provides air in an explosion chamber in the cylinder. The air is provided when fuel is combusting in the explosion chamber. The provided air is sufficient to burn out active matter in the fuel, whereby exhaust from the cylinder is substantially free of active matter in the fuel.

Another exemplary embodiment relates to a method for adding air to an explosion chamber in an engine cylinder. The method includes providing fuel into a combustion chamber of an engine and inserting additional air into the combustion chamber. The additional air is sufficient for active matter in the fuel to burn out.

DETAILED DESCRIPTION OF EXEMPLARY EMBODIMENTS

Figure 1:
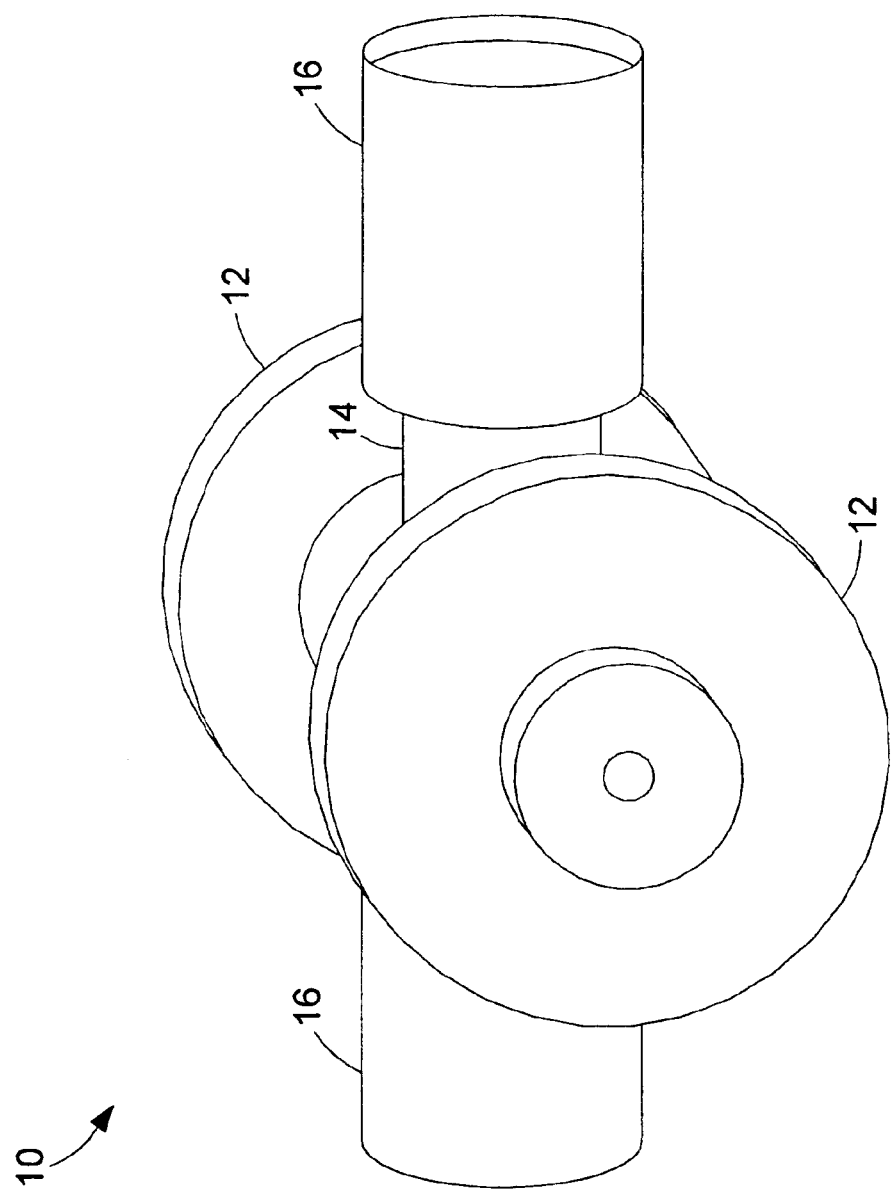
FIG. 1 is a general perspective view diagram of an engine in accordance with an exemplary embodiment.
Figure 2:
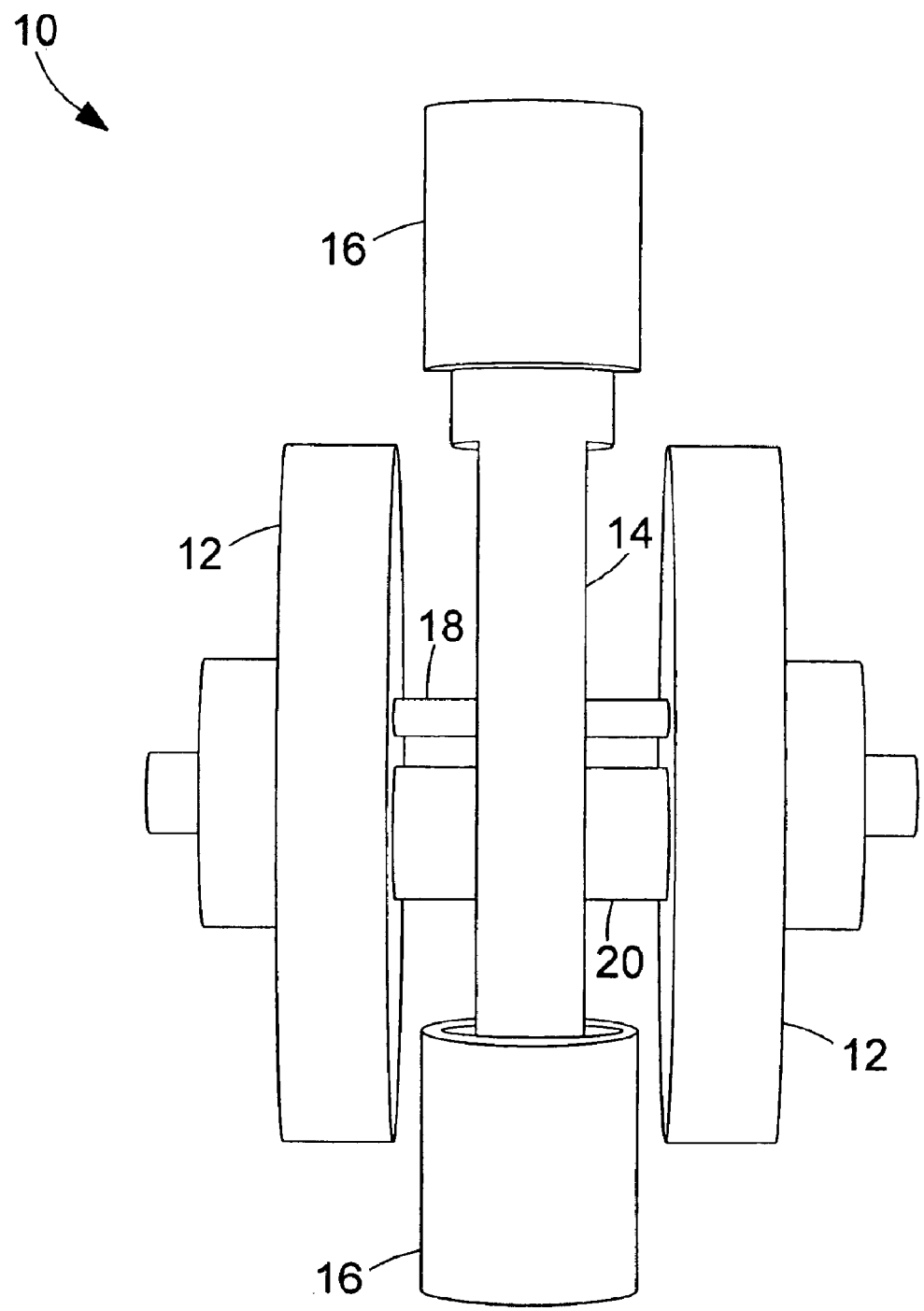
FIG. 2 is a general top view diagram of the engine of FIG. 1.

FIG. 1 illustrates a portion 10 of an engine having rotary members 12, a piston 14, and cylinder heads 16. The piston 14 is located between rotary members 12. The cylinder heads 16 are located at distal ends of the piston 14. The cylinder heads 16 can include engine head components, such as a carburetor, intake value, exhaust value, and other components described in the discussion of the related art above. As shown in FIG. 2, the rotary members 12 are coupled to the piston 14 by a connector 18 and a connector 20.

In operation, combustion of fuel and air occurs in one of the cylinder heads 16. This combustion creates a force on the piston 14 to move it laterally towards the other one of the cylinder heads 16. A combustion of fuel and air occurs in the other one of the cylinder heads 16 and forces the piston 14 back toward the original one of the cylinder heads 16. The timing of the combustions at either end of the piston 14 can be coordinated by a timing circuit. As a result of timed ignitions in the cylinder heads 16, the piston 14 is moved laterally back and forth. This lateral movement of the piston 14 is translated into rotary motion of the rotary members 12 connected by the piston 14 by connectors 18 and 20.

Figure 3:
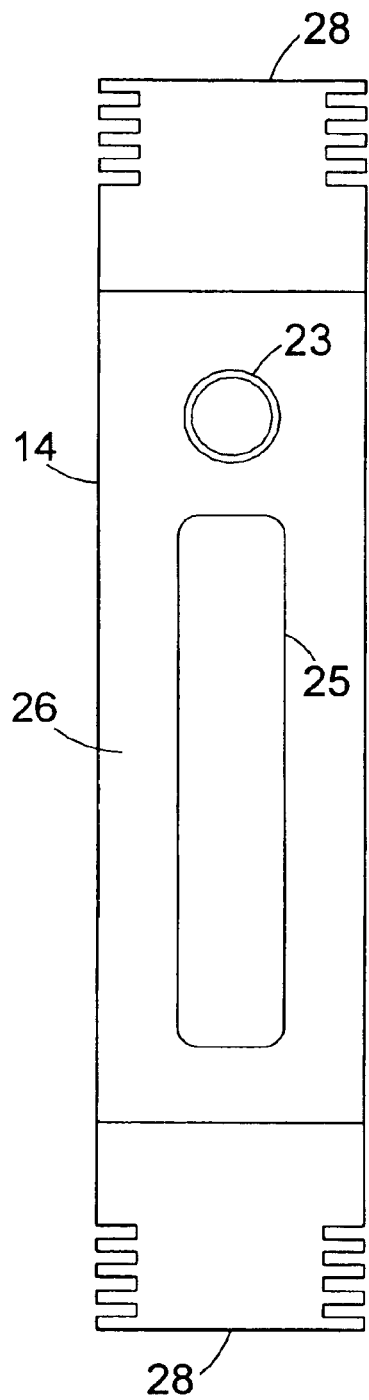
FIG. 3 is a side view diagram of a piston used in the engine of FIG. 1.
Figure 4:
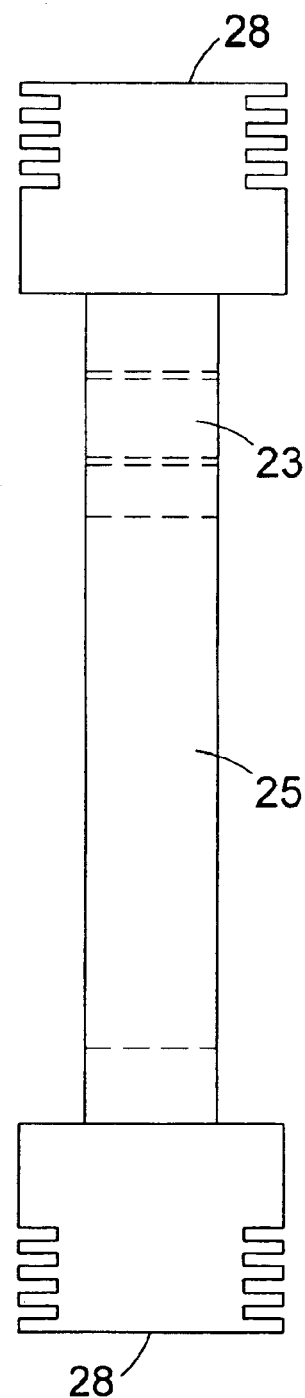
FIG. 4 is a top view diagram of the piston of FIG. 3.

FIG. 3 illustrates the piston 14, including a circular aperture 23 and a rectangular aperture 25. The connector 18 coupling the piston 14 and the rotary members 12 is located in a fixed position within the circular aperture 23. The connector 20 that also couples the piston 14 and the rotary members 12 is located within the rectangular aperture 25. The portion of connector 20 located within the rectangular aperture 25 is not in a fixed position. As shown in FIG. 4, in one embodiment, the piston 14 has a flat section 26 and cylindrical sections 28. The cylindrical sections 28 are configured to fit within the cylinder heads 16 described with reference to FIGS. 1 and 2. Other configurations of the piston 14 can also be utilized.

Figure 5:
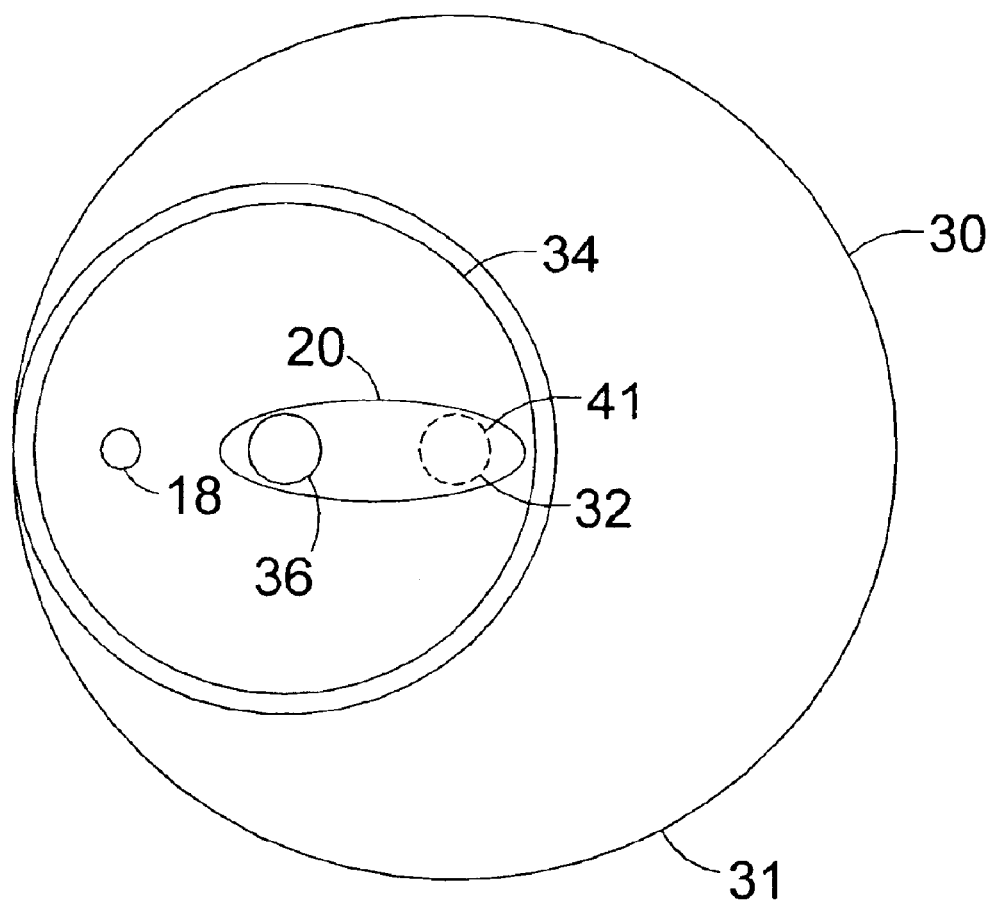
FIG. 5 is a side view diagram of a rotary member of the engine of FIG. 1.

FIG. 5 illustrates a rotary member assembly providing details of the construction of the rotary members 12 according to an exemplary embodiment. The rotary member assembly includes a main disc 31, a first axis 32, and an inset disc 34 which is offset from the first axis 32. The inset disc 34 is positioned in a cut out section of the main disc 31 and rotates about a second axis 36. In an alternative embodiment, the inset disc 34 is not inside a cut out of the main disc 31 but is coupled to the surface of the main disc 31. The embodiment with the inset disc 34 is generally preferred to achieve a balance of masses in the assembly. The connector 18 shown in FIGS. 1 and 2 coupling the piston 14 to the rotary members 12 is attached to the inset disc 34 at a distance from the axis of the inset disc 34 (second axis 36). The connector 20 shown in FIGS. 1 and 2 passes through the aperture 25 of the piston 14 and attaches to the inset disc 34 at the second axis 36. The connector 20 includes a cross bar 41 described with reference to FIGS. 10–12. The cross bar 41 is located in the same plane as the axis of the main disc 31.

Figure 6:
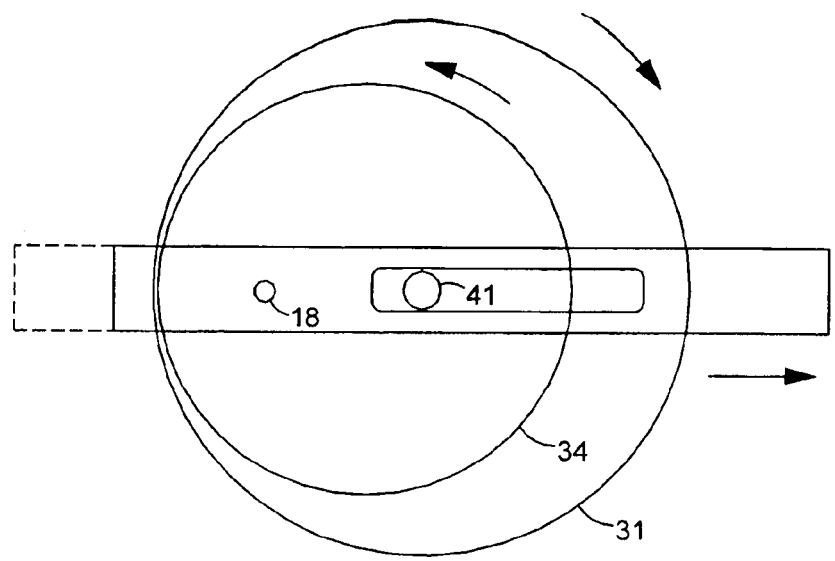
FIG. 6 is a cut-out side view diagram of the piston and rotary member of the engine of FIG. 1 at a first position.
Figure 7:
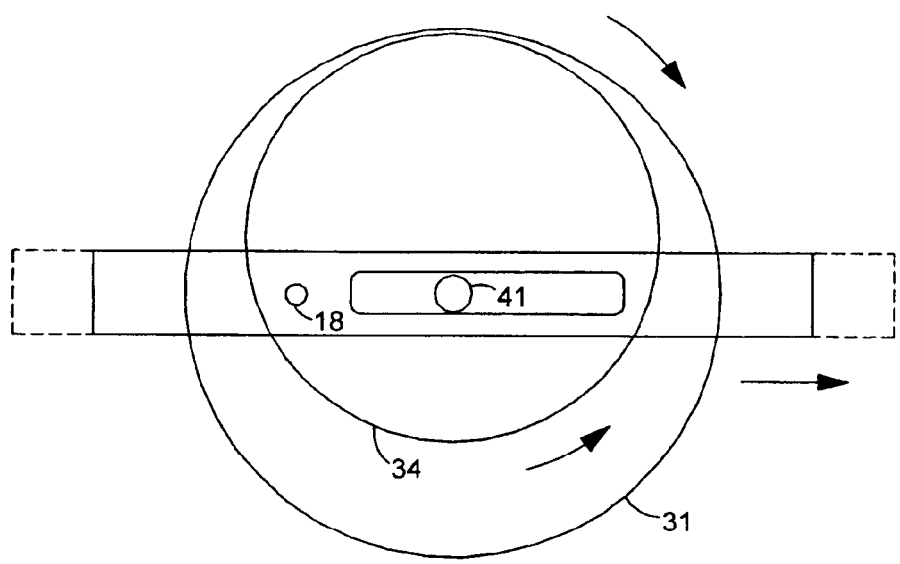
FIG. 7 is a cut-out side view diagram of the piston and rotary member of the engine of FIG. 1 at a second position.
Figure 8:
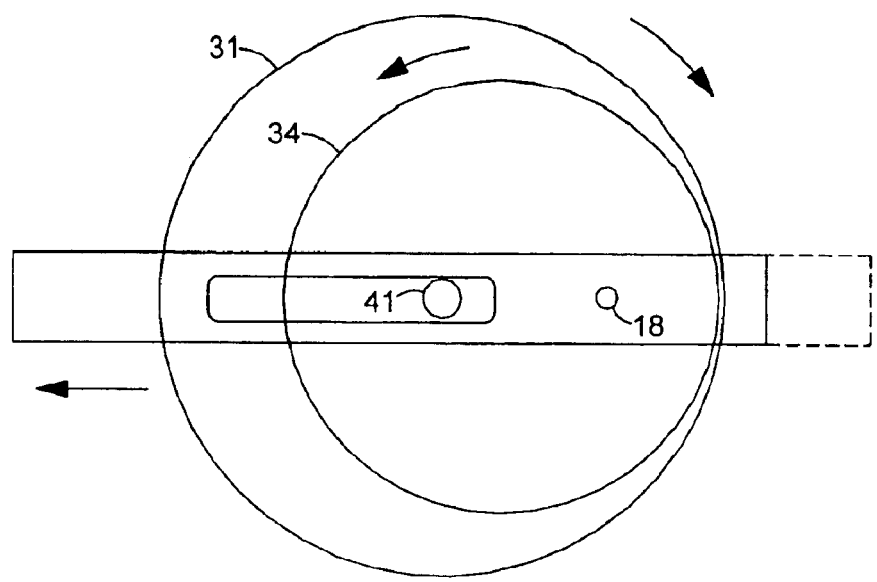
FIG. 8 is a cut-out side view diagram of the piston and rotary member of the engine of FIG. 1 at a third position.
Figure 9:
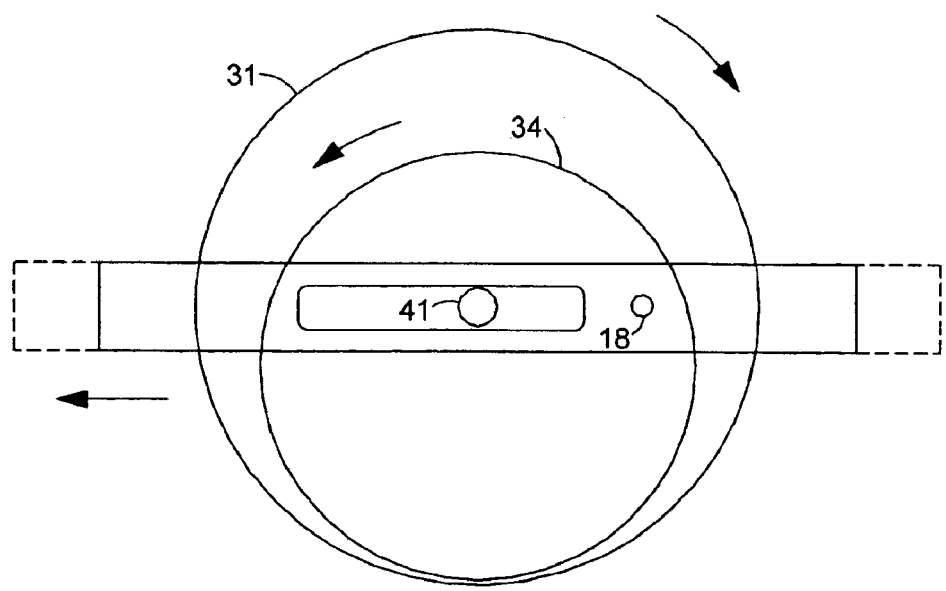
FIG. 9 is a cut-out side view diagram of the piston and rotary member of the engine of FIG. 1 at a fourth position.

FIGS. 6–9 illustrate the movement of the rotary member assembly as the piston 14 moves. In FIG. 6, the piston 14 is at its left-most position, which is the point at which a fuel and air explosion is created from a spark in the left cylinder, forcing the piston 14 toward the right. The inset disc 34 is positioned on the left of the main disc 31 with respect to the piston 14. In FIG. 7, the piston 14 is located at a middle point. The main disc 31 has moved in a clock-wise direction while the inset disc 34 has moved in a counter-clock wise direction. The inset disc 34 is positioned at the top of the main disc 31 with respect to the piston 14. In FIG. 8, the piston 14 is at its right-most position, which is the point at which a fuel and air explosion is created from a spark in the right cylinder, forcing the piston 14 toward the left. The inset disc 34 is positioned on the right of the main disc 31 with respect to the piston 14. In FIG. 9, the piston 14 is located at a middle point. The main disc 31 moves in a clock-wise direction while the inset disc 34 continues to move in a counter-clock wise direction. The inset disc 34 is positioned at the bottom of the main disc 31 with respect to the piston 14. The rotary member assembly continues to move in this fashion as the piston 14 moves laterally back and forth between the two cylinders heads 16.

Figure 10:
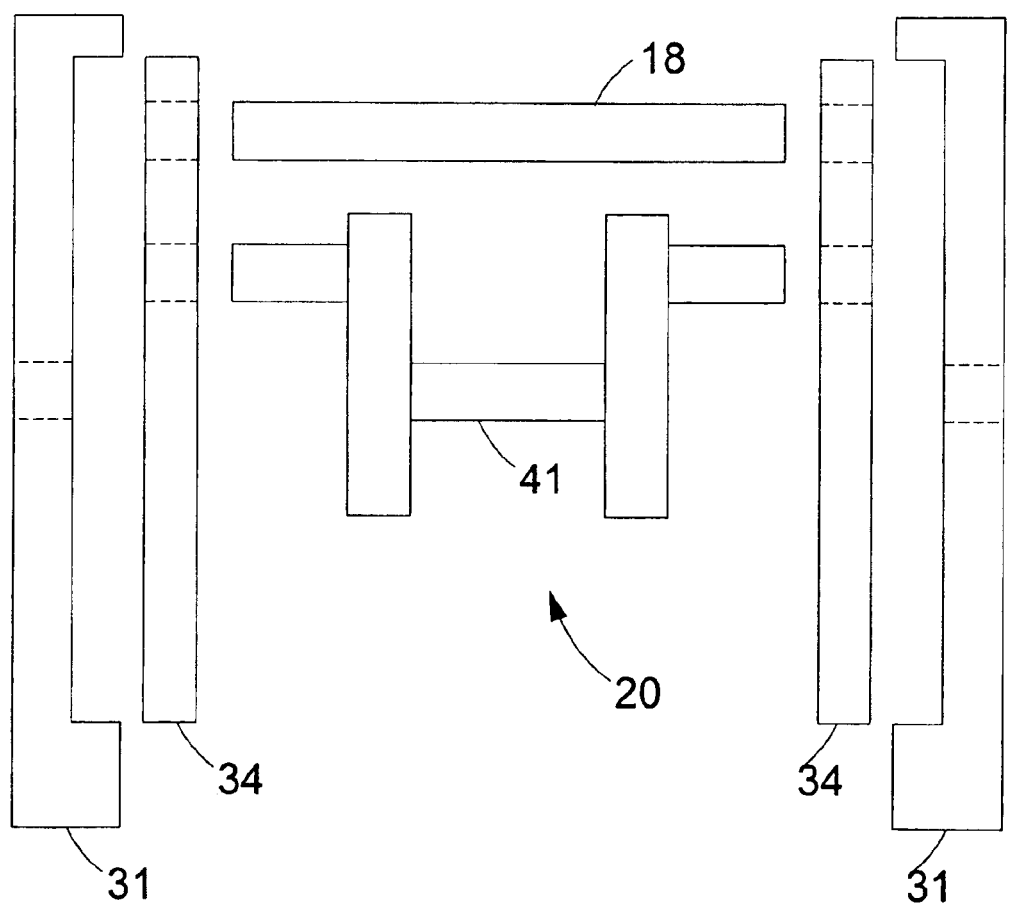
FIG. 10 is an exploded side view of the rotary member of the engine of FIG. 1.
Figure 12:
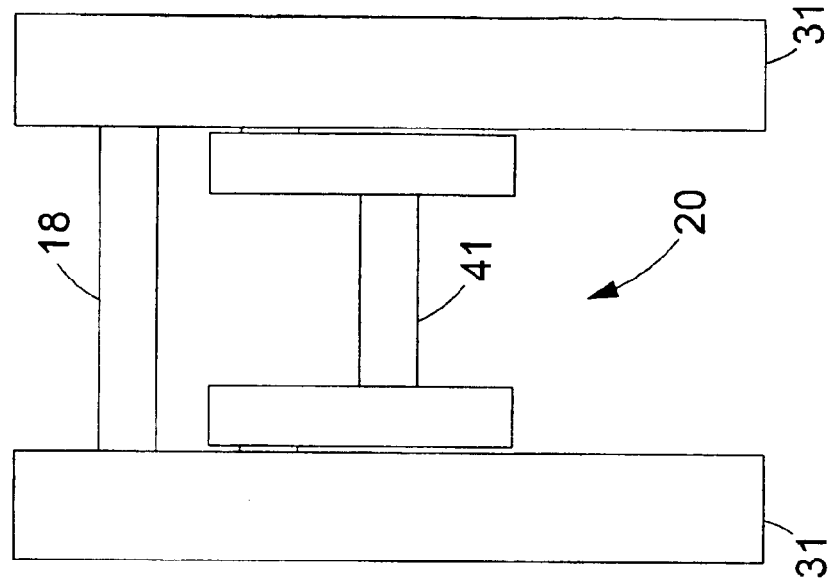
FIG. 12 is a side view of the rotary member of the engine of FIG. 1.
Figure 11:
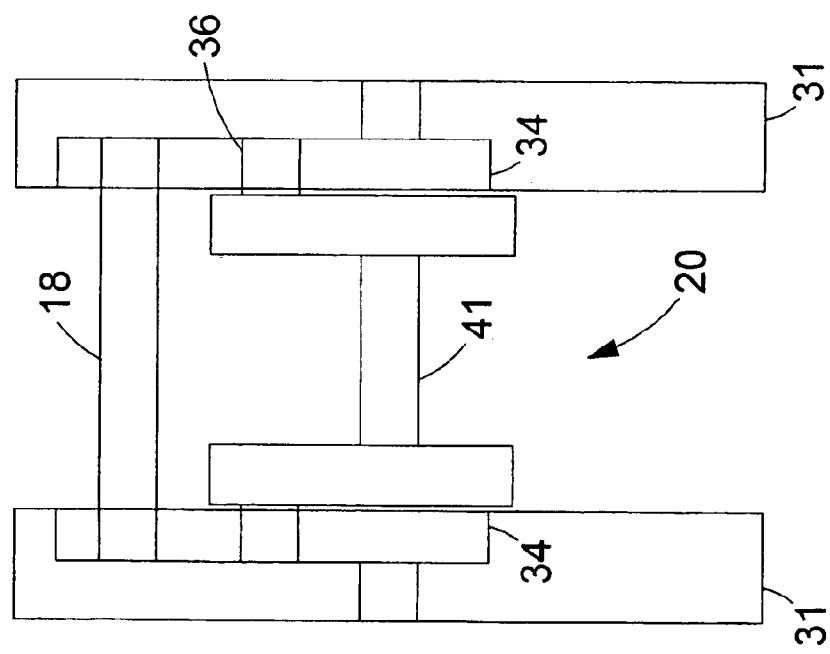
FIG. 11 is a cut-out side view of the rotary member of the engine of FIG. 1.

FIG. 10 illustrates an exploded view of the rotary member assembly described with reference to FIG. 5, showing the main disc 31, inset disc 34, connectors 18 and 20, and second axis 36. The connector 20 includes a cross bar 41 that rotates about the second axis 36 but within the rectangular aperture 25 of the piston 14 described with reference to FIGS. 3 and 4. FIG. 11 shows a cut-out view of the rotary member assembly and FIG. 12 shows a side view of the rotary member assembly including the connectors 18 and 20.

A number of advantages result from the design and operation described with reference to FIGS. 1–12. For example, the design provides balanced movement and uniform speed of rotary elements of different diameters. Further, the design provides an increase in the periods of active movement of constituent parts compared to conventional rotary transmissions. Another advantage is that the speed of the linear movement of the piston 14 is equalized with movement in the opposite direction, enabling the production of engines with high power and high rotational speed, independent of their working volume.

Compared to conventional engines, the engine described herein benefits from a simplified piston assembly, a balanced rotary motion that reduces torsion and vibration, a reduction in the friction in the piston-cylinder assembly, and a reduction in thermal burden. Furthermore, the engine has the advantage of better combustion conditions due to an approximate constant speed of the piston assembly. Other benefits from the construction and design translate into greater efficiency and improved performance.

A number of uses of the engine described are possible. For example, the engine design can be used in a wide variety of motors, compressors, water turbines, gas turbines, jet engines, propellers, hydraulics, and transmission systems. For example, the design described with reference to the Figures can be used in the transmission system of a bicycle. The design can also be utilized to reduce damages from vehicle crashes because the design provides an opposite force to slow the vehicle more easily than conventional designs.

A wide range of adaptations can be made to the design described in the present application. For example, one adaptation can include two pistons positioned at angles to each other. This implementation would have four cylinders providing power, yet it would provide significant improvements over conventional four cylinder engines. Other configurations and variations can also be implemented depending on the needs of the design's use.

In performance tests conducted by the inventors, the design has provided an increase in torque many times greater than conventional systems. A person of skill in the art can represent the forces created in formulaic terms such that the performance advantages of the design described herein can be mathematically compared to known systems.

Figure 13:
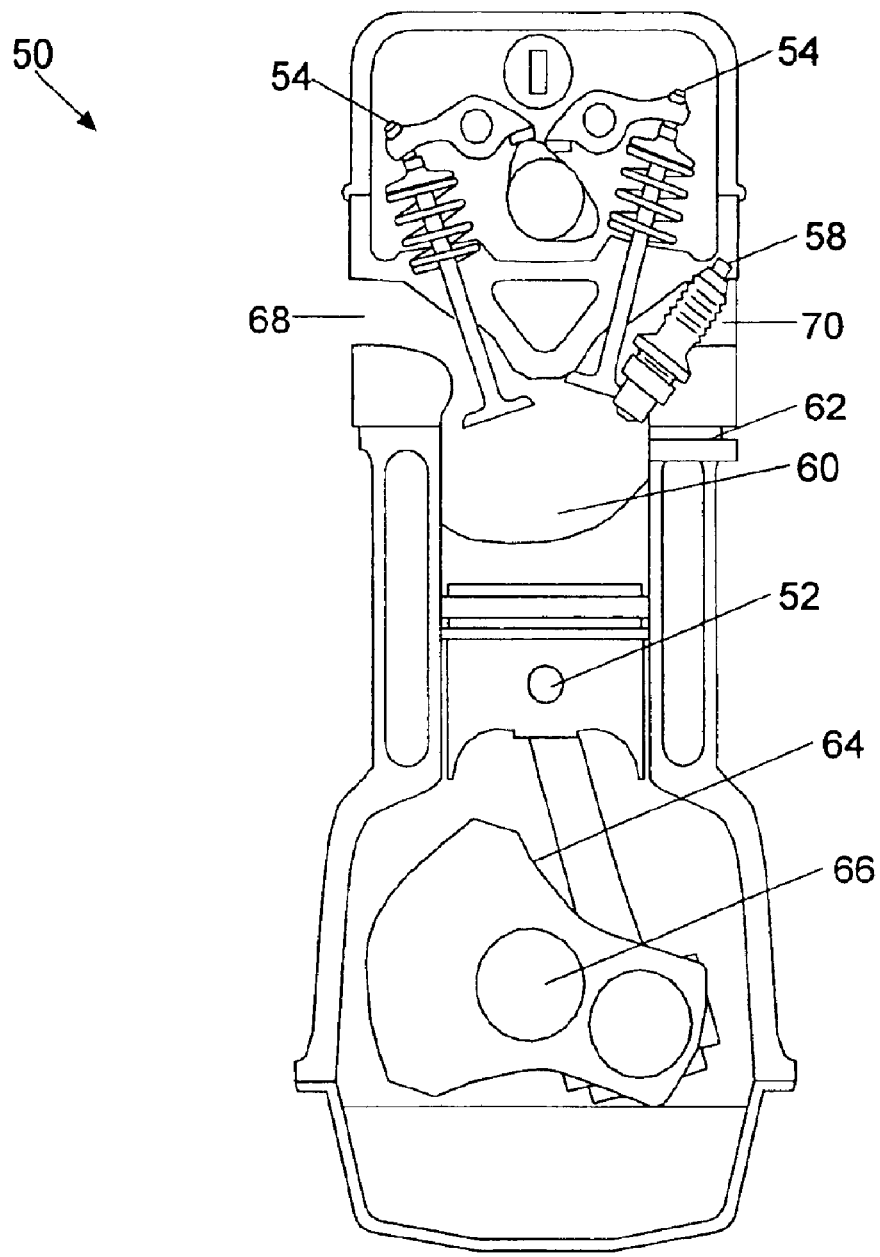
FIG. 13 is a cut-out side view diagram of an engine cylinder having a piston at a first position.

FIG. 13 illustrates a portion 50 of an engine having a piston 52, an intake valve 54, an exhaust valve 56, a spark plug 58, a combustion chamber 60, an air injector 62, a connecting rod 64, and a crankshaft (or disc) 66. The piston 52 moves up and down within a cylinder. The intake valve 54 opens and closes an intake port 68 to allow a fuel and air mixture to enter the combustion chamber 60 in the cylinder with the piston 52 forming the floor of the combustion chamber 60. The exhaust valve 56 opens and closes an exhaust port 70 as the piston returns to its position in the combustion chamber 60 before the explosion, helping to push the exhaust from the fuel and air explosion out of the combustion chamber 60. The spark plug 58 creates an electric spark in the combustion chamber 60 to ignite fuel and air and force the piston 52 downward and rotate the crankshaft 66. The connecting rod 64 couples the piston 52 to the crankshaft 66. When applied to the embodiments described with reference to FIGS. 1–12, the crankshaft 66 is the main disc 31.

The air injector 62 is located toward the top of the combustion chamber 60 at what is known as the head of the engine. Alternatively, the air injector 62 can be built into the piston 52. In yet another alternative embodiment, the air injector 62 can be built into the body of the cylinder.

The air injector 62 provides additional air to the combustion chamber 60 during the expansion stroke, or when the piston 52 is moving from the middle of the cylinder downward to its lowest point and upward toward the middle point of the cylinder again. This additional air from the air injector 62 provides the air necessary to complete the burning process of the fuel such that substantially all active matter of the fuel is burned out. As a result, the exhaust contains less fuel, meaning that the exhaust is a cleaner emission.

FIG. 13 illustrates the piston 52 in a first position in which the intake valve 54 is open and fuel and air are coming into the combustion chamber 60 via the intake port 68. The piston 52 is moving downward, which creates a suction effect to facilitate the intake of the fuel and air. For purposes of this description, the crankshaft 66 is located in a 0 degree position.

Figure 14:
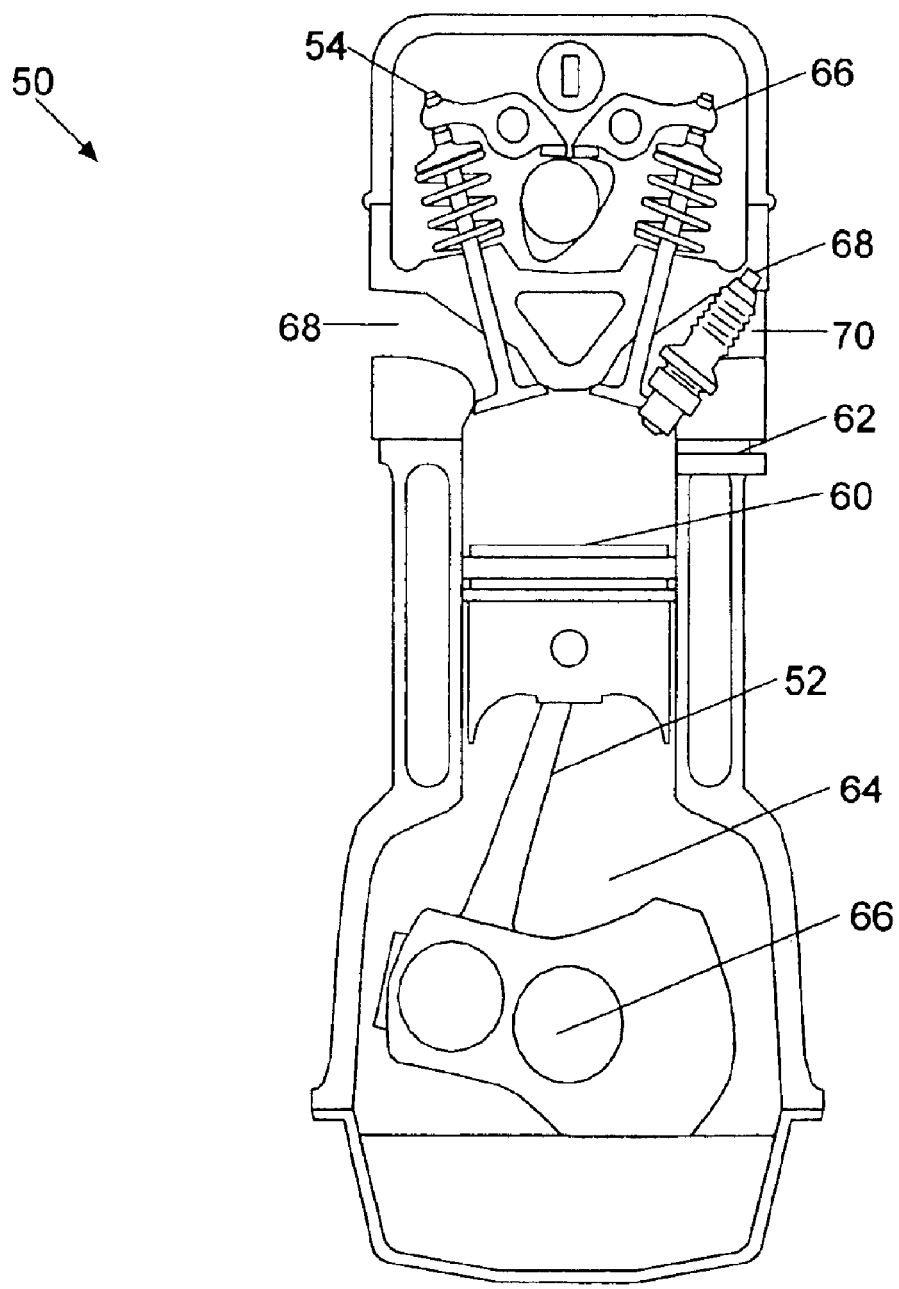
FIG. 14 is a cut-out side view diagram of the engine cylinder of FIG. 13 with the piston at a second position.

FIG. 14 illustrates the piston 52 in a second position in which the intake valve 54 and exhaust valve 56 are closed. The piston 52 is moving upward, which creates pressure in the combustion chamber 60 to facilitate the combustion of the fuel and air. The crankshaft 66 is located in a 180 degree position compared to the position of the crankshaft 66 in FIG. 13.

Figure 15:
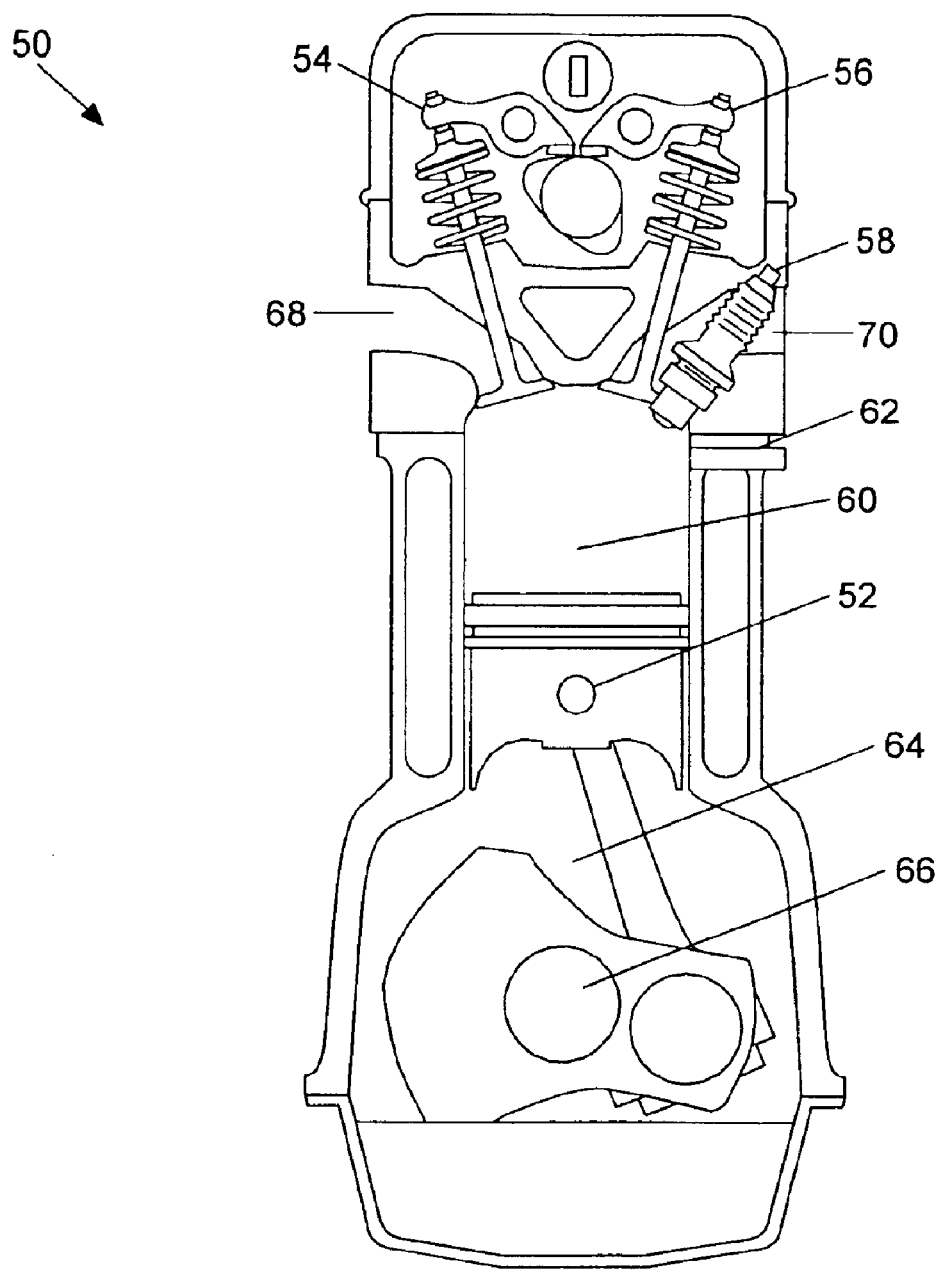
FIG. 15 is a cut-out side view diagram of the engine cylinder of FIG. 13 with the piston at a third position.

FIG. 15 illustrates the piston 52 in a third position in which the intake valve 54 and exhaust valve 56 remain closed. The piston 52 is moving downward from the force of an explosion of the fuel and air caused by an electric spark from the spark plug 58. The crankshaft 66 is located in a 360 degree position compared to the position of the crankshaft 66 in FIG. 13.

From the time the crankshaft 26 is located in the 360 degree position (FIG. 15) to a 540 degree position (FIG. 16), air is injected into the combustion chamber 60 by the air injector 62. This additional air mixes with the fuel allows the fuel to substantially burn out, leaving substantially no fuel to escape through the exhaust port 70.

Figure 16:
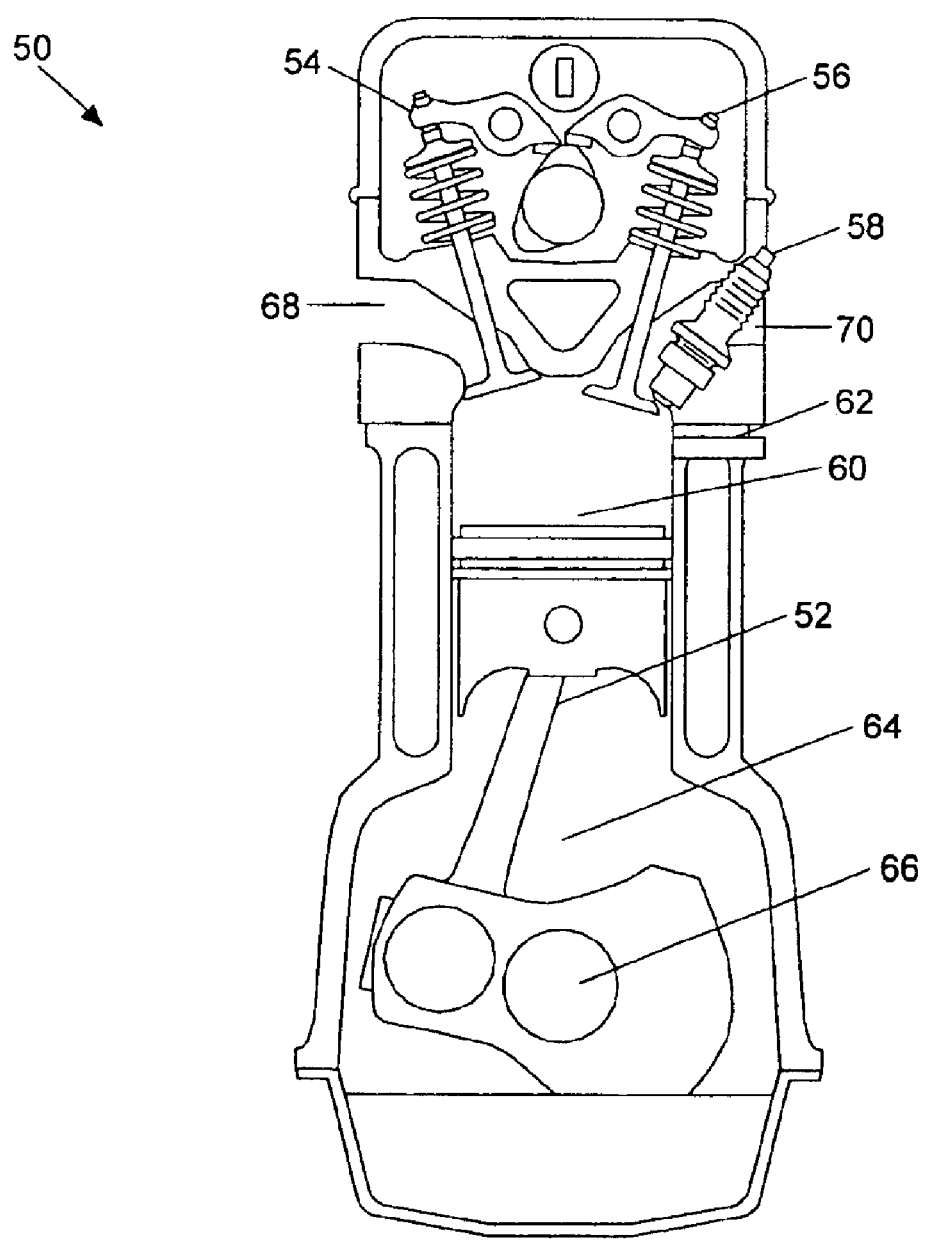
FIG. 16 is a cut-out side view diagram of the engine cylinder of FIG. 13 with the piston at a fourth position.

FIG. 16 illustrates the piston 52 in a fourth position in which the exhaust valve 56 is opened and exhaust escapes the combustion chamber 60 through the exhaust port 70. The piston 52 is moving upward, which creates pressure to push the exhaust out the exhaust port 70. The crankshaft 66 is located in a 540 degree position compared to the position of the crankshaft 66 in FIG. 13.

Figure 17:
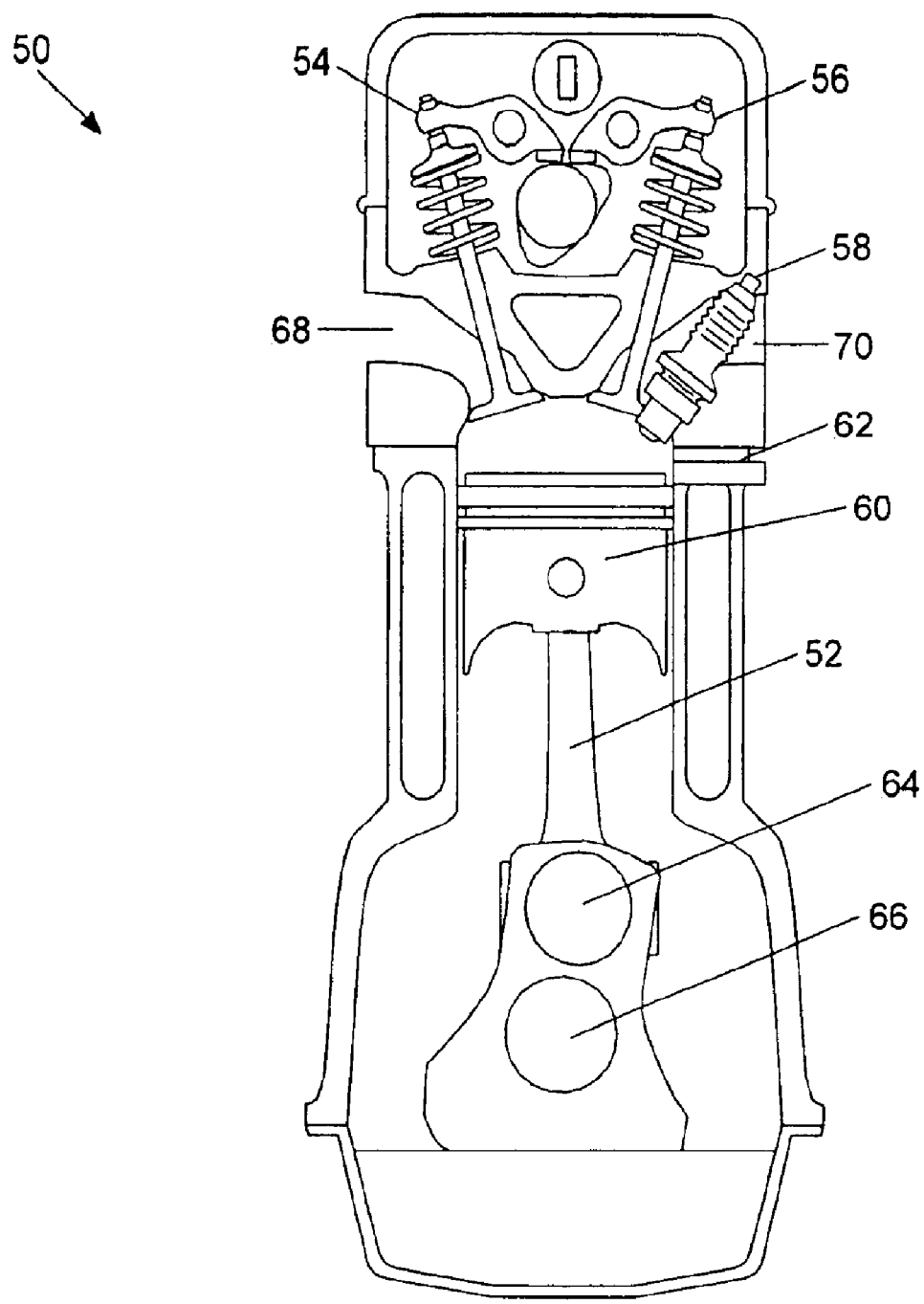
FIG. 17 is a cut-out side view diagram of the engine cylinder of FIG. 13 with the piston between the first and fourth positions.

FIG. 17 illustrates the piston 52 in a position in between the first position (FIG. 13) and the fourth position (FIG. 16) in which the intake valve 54 and exhaust valve 56 are closed. The piston 52 is at its up most position. The space above the piston 52 at this point is referred to as dead space. Without additional air from the air injector 62, unused fuel can fill this dead space. The additional air from the air injector 62 allows substantially all of the fuel to burn out, leaving substantially no fuel to escape as exhaust.

The exact timing that the air injector 62 provides air to the combustion chamber 60 depends on the compression characteristics of the particular engine. The location of the crankshaft when the air injector 62 provides air also is different depending on the type of engine. For example, in a two stroke motor embodiment, air from the air injector 62 is provided when the crankshaft is between 0 and 90 degrees rotation.

When the burning fuel and air mixture is in its hottest state and all of the air in the combustion chamber 60 is used for the ignition and explosion so the additionally added air allows the fuel to continue to burn until active matter in the fuel is burned out.

The air injector 62 can be utilized in four stroke engines, two stroke engines, and one stroke engines, such as the engine described with reference to FIGS. 1–12. The air injector 62 can also be used in a wide variety of motors, compressors, water turbines, gas turbines, jet engines, propellers, hydraulics, and transmission systems. The design described with reference to the FIG. 13–17 provides cleaner emissions of exhausting gases, thereby reducing the pollutants expelled by engines into the environment. The exhaust is also cooler and does not heat the environment.

While several embodiments of the invention have been described, it is to be understood that modifications and changes will occur to those skilled in the art to which the invention pertains. For example, although particular embodiments and implementations described contemplate particular configurations and dimensions, other designs and sizes may also include the functionalities described herein. The invention is not limited to a particular embodiment, but extends to various modifications, combinations, and permutations that nevertheless fall within the scope and spirit of the appended claims.

What is claimed is:

1. An engine comprising:
   a piston located in a cylinder, wherein the piston has one stroke and is coupled to an offset rotary element by a first coupling fixed in position relative to the piston and a second coupling that moves within a space in the piston;
   an inlet through which at least a portion of fuel for an ignition and combustion is passed into the cylinder;
   an outlet through which exhaust from the combustion is removed from the cylinder; and
   an air injector that injects air into the cylinder after the ignition and before exhaust escapes through the outlet, the air injector injecting sufficient air to burn out all active matter of the fuel.

2. The engine of claim 1, wherein the air injector is located at a head of the engine.

3. The engine of claim 1, wherein the air injector is built into the piston.

4. The engine of claim 1, wherein the air injector is built into the cylinder.

5. The engine of claim 1, further comprising a crankshaft rotatably coupled to the piston, wherein the air injector injects air into the cylinder when the crankshaft has rotated between 360 and 540 degrees.

6. The engine of claim 1, wherein the injected air substantially removes fuel remaining from combustion in a dead space above the piston.

7. The engine of claim 1, further comprising a fuel injector that injects fuel into the cylinder, wherein the at least a portion of fuel passing through the inlet comprises air.

8. A system for adding air to an explosion chamber in an engine cylinder, the system comprising:
   a piston located in a cylinder;
   an air injector that provides air in an explosion chamber in the cylinder, wherein the air is provided when fuel is combusting in the explosion chamber, the provided air being sufficient to burn out active matter in the fuel, whereby exhaust from the cylinder is substantially free of active matter in the fuel; and
   a rotary member including a first axis about which the rotary member rotates, the rotary member further including a second axis coupling the rotary member to an offset rotary element, wherein the piston is coupled to the offset rotary element by a first coupling fixed in position relative to the linear member and a second coupling that moves within a space in the piston, wherein the piston moves back and forth in lateral fashion from a first position to a second position, the lateral movement of the piston causing continuous rotational movement of the rotary member in one direction.

9. The system of claim 8, wherein the fuel comprises gasoline.

10. The system of claim 8, wherein the fuel comprises diesel.

11. The system of claim 8, wherein the air injector is built into the cylinder.

12. The system of claim 8, wherein the air injector is built into an engine head.

13. The piston of claim 8, wherein the air injector is controlled by an electrical timing circuit.

14. The piston of claim 8, wherein the air injector is controlled by mechanical action.

15. A method for adding air to an explosion chamber in an engine cylinder, the method comprising:
   providing fuel into a combustion chamber of an engine, wherein the engine is a one stroke engine and combustion of the provided fuel forces a linear member in the engine to move laterally, the linear member being coupled to an offset rotary element by a first coupling fixed in position relative to the linear member and a second coupling that moves within a space in the linear member, the lateral movement of the linear member causing continuous rotational movement of a rotary member coupled to the offset rotary element; and inserting additional air into the combustion chamber, the additional air being sufficient for active matter in the fuel to burn out.

16. The method of claim 15, wherein inserting additional air into the combustion chamber comprises inserting additional air when a rotating crankshaft of the engine is rotated between 360 and 540 degrees.

17. The method of claim 15, wherein the inserted air substantially removes fuel remaining from combustion in a dead space of the combustion chamber.

18. The engine of claim 1, wherein the offset rotary element is coupled to a rotary member, the rotary member including a first axis about which the rotary member rotates and a second axis coupling the rotary member to the offset rotary element.

* * * * *